(12) United States Patent
Santori, Jr. et al.

(10) Patent No.: US 8,086,267 B2
(45) Date of Patent: Dec. 27, 2011

(54) SYSTEM AND METHOD FOR PROVISIONING A WIRELESS NETWORKING CONNECTION

(75) Inventors: Nello Joseph Santori, Jr., Canton, MI (US); Brian Woogeun Joh, Ann Arbor, MI (US); Joseph N. Ross, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 12/388,803

(22) Filed: Feb. 19, 2009

(65) Prior Publication Data
US 2010/0210302 A1    Aug. 19, 2010

(51) Int. Cl.
*H04B 1/38* (2006.01)
(52) U.S. Cl. ............... 455/557; 709/206; 455/556.1; 455/569.2
(58) Field of Classification Search .......... 455/411, 455/466, 410, 406, 557, 414.1, 560; 370/311, 370/401, 338; 709/206, 226; 348/207.1, 348/E5.042
See application file for complete search history.

(56) References Cited

U.S. PATENT DOCUMENTS

| | | | | |
|---|---|---|---|---|
| 6,052,603 | A * | 4/2000 | Kinzalow et al. | 455/557 |
| 7,363,061 | B2 * | 4/2008 | Kakehi | 455/569.2 |
| 7,395,052 | B2 | 7/2008 | Mitterreiter et al. | |
| 2006/0143097 | A1 * | 6/2006 | Mitterreiter et al. | 705/28 |
| 2006/0168627 | A1 * | 7/2006 | Zeinstra et al. | 725/75 |
| 2006/0234769 | A1 * | 10/2006 | Srinivasan et al. | 455/556.1 |
| 2007/0140187 | A1 * | 6/2007 | Rokusek et al. | 370/338 |
| 2008/0200216 | A1 * | 8/2008 | Schwarcz | 455/569.2 |
| 2009/0292416 | A1 * | 11/2009 | Ubik et al. | 701/33 |
| 2009/0298474 | A1 * | 12/2009 | George | 455/412.2 |
| 2010/0169432 | A1 * | 7/2010 | Santori et al. | 709/206 |
| 2010/0245123 | A1 * | 9/2010 | Prasad et al. | 340/870.41 |

OTHER PUBLICATIONS

Ford Motor Company, "SYNC with Navigation System," Owner's Guide Supplement, SYNC System Version 1 (Jul. 2007).
Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ricky Says, Use Your Cell Phone as a Laptop Modem (PC and Mac), http://www.rickysays.com/cell-phone-as-a-laptop-modem, pp. 1-19.
Kermit Whitfield, "A hitchhiker's guide to the telematics ecosystem", Automotive Design & Production, Oct. 2003, http://findarticles.com, pp. 1-3.

(Continued)

*Primary Examiner* — Nick Corsaro
*Assistant Examiner* — Mahendra Patel
(74) *Attorney, Agent, or Firm* — Jennifer M. Stec; Brooks Kushman P.C.

(57) ABSTRACT

A vehicle communication system includes a processor that may query a wireless device to determine, among other things, a carrier identity. The carrier identity is the identity of the service provider for the wireless device. If the carrier identity is known, the processor may use a lookup table to determine an access phone number (APN) and a user name and password for provisioning a wireless internet connection through the wireless device. If the carrier identity is unknown, or if more than one APN and/or user name/password combination are associated with a given carrier, the processor is operable to perform a guess and check process to determine the appropriate provisioning information.

12 Claims, 5 Drawing Sheets

OTHER PUBLICATIONS

International Searching Authority, The International Search Report and Written Opinion of the International Searching Authority for the corresponding International Application No. PCT/US2010/024280 mailed Apr. 14, 2010.

International Preliminary Examining Authority, Notification of Transmittal of International Preliminary Report on Patentability for the corresponding PCT/US2010/24280 mailed May 23, 2011.

* cited by examiner

SYSTEM AND METHOD FOR PROVISIONING A WIRELESS NETWORKING CONNECTION

TECHNICAL FIELD

The illustrative embodiments generally relate to a system and method for provisioning a wireless connection between a wireless device and a vehicle-based computing system.

BACKGROUND

Many cellular phones, PDAs and other wireless devices are capable of internet connection. Typically, these devices can use a dial-up connection, which is a lower speed connection, or be supplied with a data-plan, and use a broad-band connection, which is a higher speed connection.

Additionally, many of these wireless devices are BLUETOOTH enabled, or provided with some other type of wireless networking capability. BLUETOOTH provides a connection through which a secondary device, such as a laptop computer, can be used to connect to the wireless device and, through it, to the internet.

Simply establishing communication between the laptop and the wireless device may not be sufficient, however, to create an internet connection. It may be the case that additional information needs to be entered by a user.

One example of this is provided at "http://www.rickysays.com/cell-phone-as-a-laptop-modem." According to this website, both the phone and the computer require some configuration to set-up a wireless internet connection through the phone. Such configuration of the communication connection may also be called "provisioning."

According to the website, the first step is to "pair" the wireless device with the laptop. The website states:

For a WINDOWS VISTA PC, follow these steps:
1. Click on the Start Button, click on Control Panel, click on Printers and Other Hardware, and click on BLUETOOTH devices.
2. Click Add and then follow the instructions (the PC then provides a series of instructions on how to pair the devices).

Once the pairing is complete, the process is only partially finished. The computer and wireless device can now "talk" to each other, but an internet connection may not yet be established. Accordingly, the website continues:
1. Click the Start Icon and the select the "Connect To" menu
2. Select your phone from the list, and click "Connect." You'll be prompted to enter your dial-up account user name, password, and phone number.

Naturally, completion of these steps requires the user to know the dial-up account user name, password and phone number. This information, however, may not be readily known to a user. Often it requires some searching on a provider's website to discover. Unlike many user name/password combinations, this particular user name/password combination may not be user-selected. Many wireless data-plan providers use a generic or formulaic user-name/password combination. For example, Verizon uses—phone number without dashes@vzw3g.com as a user name, and "vzw" as a password (i.e., if a user's phone number was 555-555-1212, then the user name would be: 5555551212@vzw3g.com). Each individual provider may have a different formula or generic login credentials. Thus, if different wireless devices are used to connect from a single laptop at different times, it is likely that the login credentials and phone number for each connection would need to be known and input by the user.

SUMMARY OF ILLUSTRATIVE EMBODIMENTS

In one illustrative embodiment, a vehicle communication system includes a computer processor in communication with persistent and non-persistent memory. The system also includes a transceiver capable of communicating with one or more wireless devices and in communication with the processor.

In this illustrative embodiment, the processor may query a wireless device in communication with the processor through the transceiver. Based at least in part on information obtained during the query, the processor is operable to determine a carrier identity for a service provider for the wireless device.

Also, in this illustrative implementation, the processor may further determine information for provisioning a connection to a remote network through the wireless device, based at least in part on the carrier identity.

In this illustrative embodiment, the processor may also connect to a remote network over a wide band connection through the wireless device after provisioning a connection to the wireless device using the information for provisioning a connection.

BRIEF DESCRIPTION OF THE DRAWINGS

Other aspects and characteristics of the illustrative embodiments will become apparent from the following detailed description of exemplary embodiments, when read in view of the accompanying drawings, in which.

DETAILED DESCRIPTION OF ILLUSTRATIVE EMBODIMENTS

The present invention is described herein in the context of particular exemplary illustrative embodiments. However, it will be recognized by those of ordinary skill that modification, extensions and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

According to one illustrative embodiment, a vehicle-based computing system is capable of connection with a plurality of different BLUETOOTH devices, in a provider-transparent fashion. The vehicle-based computing system performs the provisioning, and a user may only need to provide a wireless device with a data plan and BLUETOOTH or other wireless communication capability. This provides the user with a convenient and simple connection experience.

Figure 1:
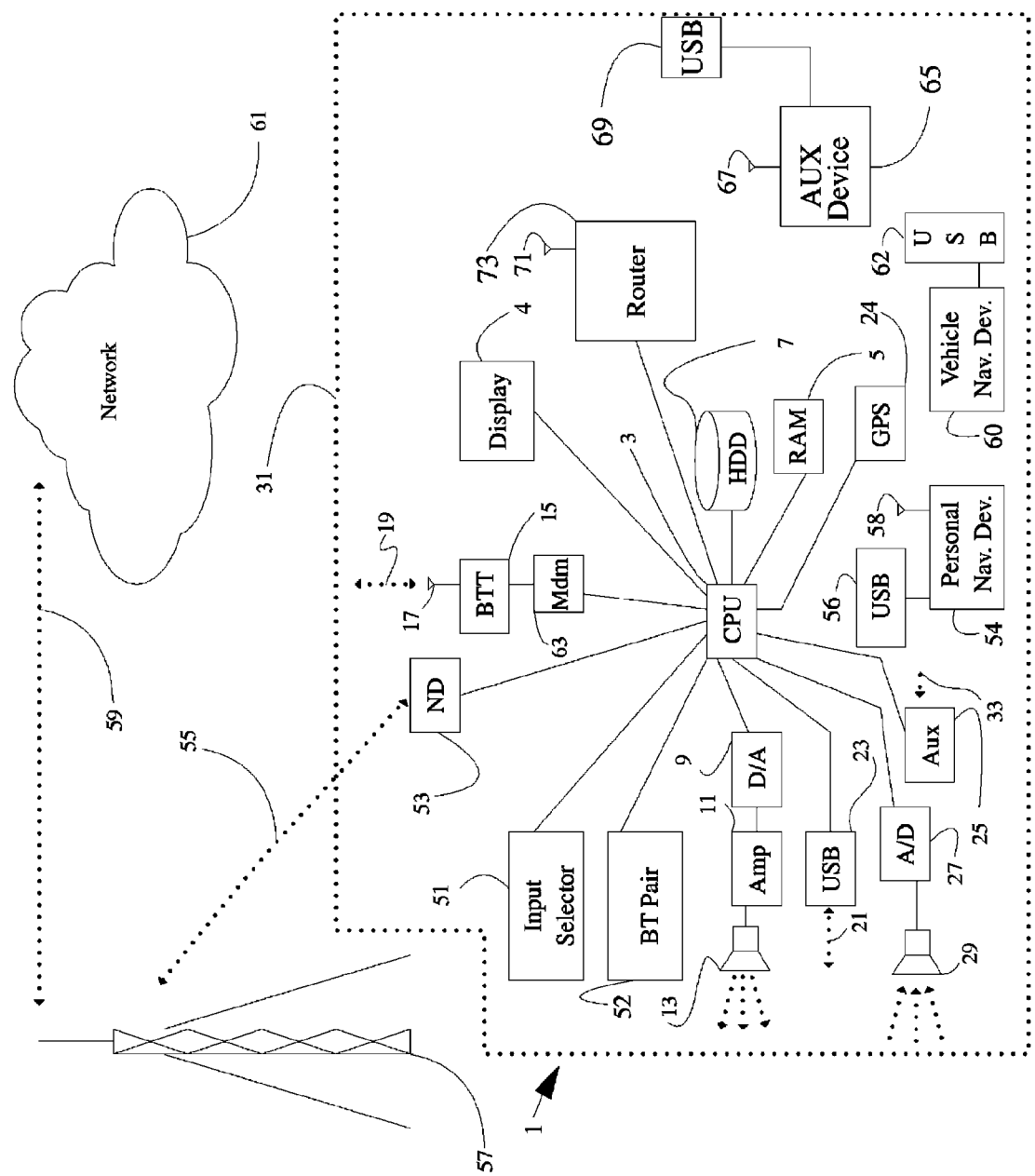
FIG. 1 shows an illustrative example of a vehicle communication and entertainment system capable of network connection.

FIG. 1 illustrates system architecture of an illustrative onboard communication system usable for delivery of directions to an automobile. A vehicle enabled with a vehicle-based computing system may contain a visual display 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., without limitation, cell phone, smart phone, PDA, etc.). The nomadic device can then be used to communicate 59 with a network 61 outside the vehicle 31 through, for example, communication 55 with a cellular tower 57.

Pairing a nomadic device 53 and the BLUETOOTH transceiver 15 can be instructed through a button 52 or similar input, telling the CPU that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
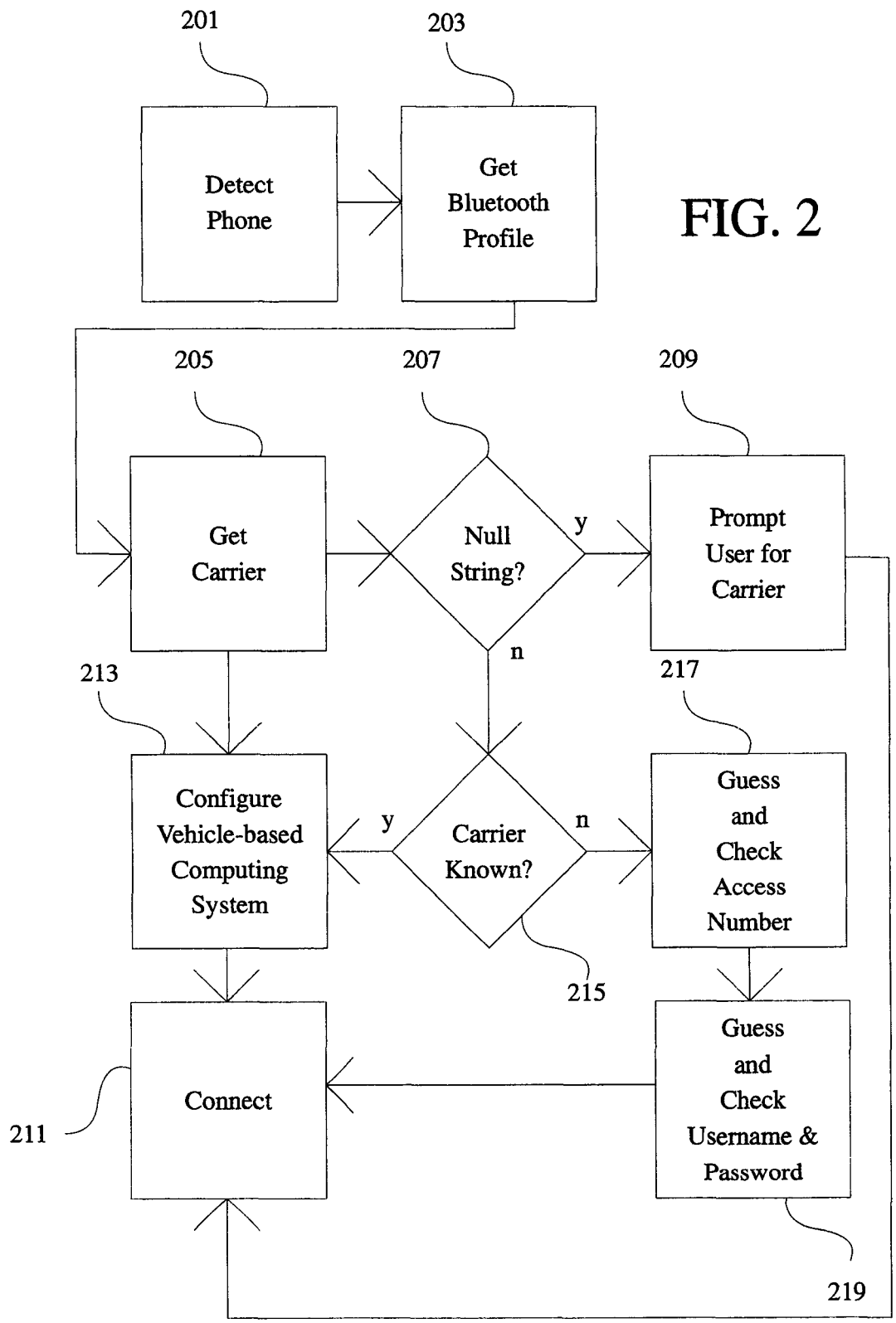
FIG. 2 shows an illustrative exemplary flow for communication connection between a vehicle-based computing system and a wireless device.

FIG. 2 shows an illustrative exemplary flow for communication connection between a vehicle-based computing system and a wireless device. Initially, a vehicle-based computing system is provided with at least a transceiver, capable of receiving a signal from a wireless device.

The transceiver detects the presence of a wireless device 201, such as a BLUETOOTH enabled cellular phone. In this illustrative embodiment, a pairing has already been made between the wireless device and the vehicle-based computing system allowing communication between the two. If, however, such a pairing is not made, and is needed, it can be done in a conventional fashion.

Once the signal is detected and communication is possible between the vehicle-based computing system and the wireless device, the system retrieves a BLUETOOTH profile of the wireless device 203. This may be done by, for example, auditing the device.

In response to an audit request, the device may send a variety of information back to the vehicle-based computing system. This information can include, but is not limited to, a hands free profile (HFP), a dial-up networking (DUN) profile, a personal area network (PAN) profile, a serial port profile, a fax profile and a file transfer profile (FTP) profile, an advanced audio distribution profile (A2DP), an audio/video remote control profile (AVRCP), a basic imaging profile (BIP), a basic printing profile (BPP), a common ISDN access profile (CIP), a cordless telephony profile (CTP), a device ID profile (DID), a general audio/video distribution profile (GAVDP), a general access profile (GAP), a generic object exchange profile (GOEP), a hard copy cable replacement profile (HCRP), a human interface device profile (HID), a headset profile (HSP), an intercom profile (ICP), a LAN access profile (LAP), an object push profile (OPP), a phone book access profile (PBAP), a service discovery application profile (SDAP), a SIM access profile (SAP, SIM), a synchronization profile (SYNCH), a video distribution profile (VDP), and a wireless application protocol bearer (WAPB).

The HFP may be used to allow a hands-free kit (such as may be installed in an automobile) to communicate with a BLUETOOTH device. In addition, the HFP can provide useful information about a BLUETOOTH device. For example, the HFP may provide a "carrier string," which can provide the vehicle-based computing system with the name of the carrier 205. The use of the carrier information will be described later in detail.

Alternatively, the carrier string may be a NULL string 207. If the string is NULL, that means that the vehicle based system may not be able to detect the carrier from the carrier string provided by the HFP. In this instance, the vehicle based system may prompt the user to provide the carrier 209.

In one illustrative embodiment, such prompting is done through vehicle speakers in an audible fashion. Alternatively, a message could be displayed on a vehicle display device, such as a navigation display or other display. Any other suitable method of prompting the user is also possible.

In response to the prompt, the user will need to provide the name of the carrier, if known. If the vehicle-based system is equipped with a microphone and a form of voice-recognition technology, this input can be done using the microphone. Alternatively, it could be entered into an interactive vehicle display, entered on a remote device and downloaded to the vehicle, or provided in any other suitable manner.

If the carrier is known to the user 215, or if the carrier is obtainable from a carrier string, the vehicle-based communication system may proceed to configure a device connection between the system and the wireless device 213. A non-limiting illustrative example of this process is provided with respect to FIG. 3.

If the carrier is unknown to the user 215, the vehicle-based system may engage in a guess-and-check process to determine the carrier 217 and/or the user name and password combination 219. Non-limiting illustrative examples of these guess-and-check procedures are provided with respect to FIGS. 4 & 5.

After a connection between the device and the vehicle-based computing system is established, the system can then use the device to connect to the internet 211.

Figure 3:
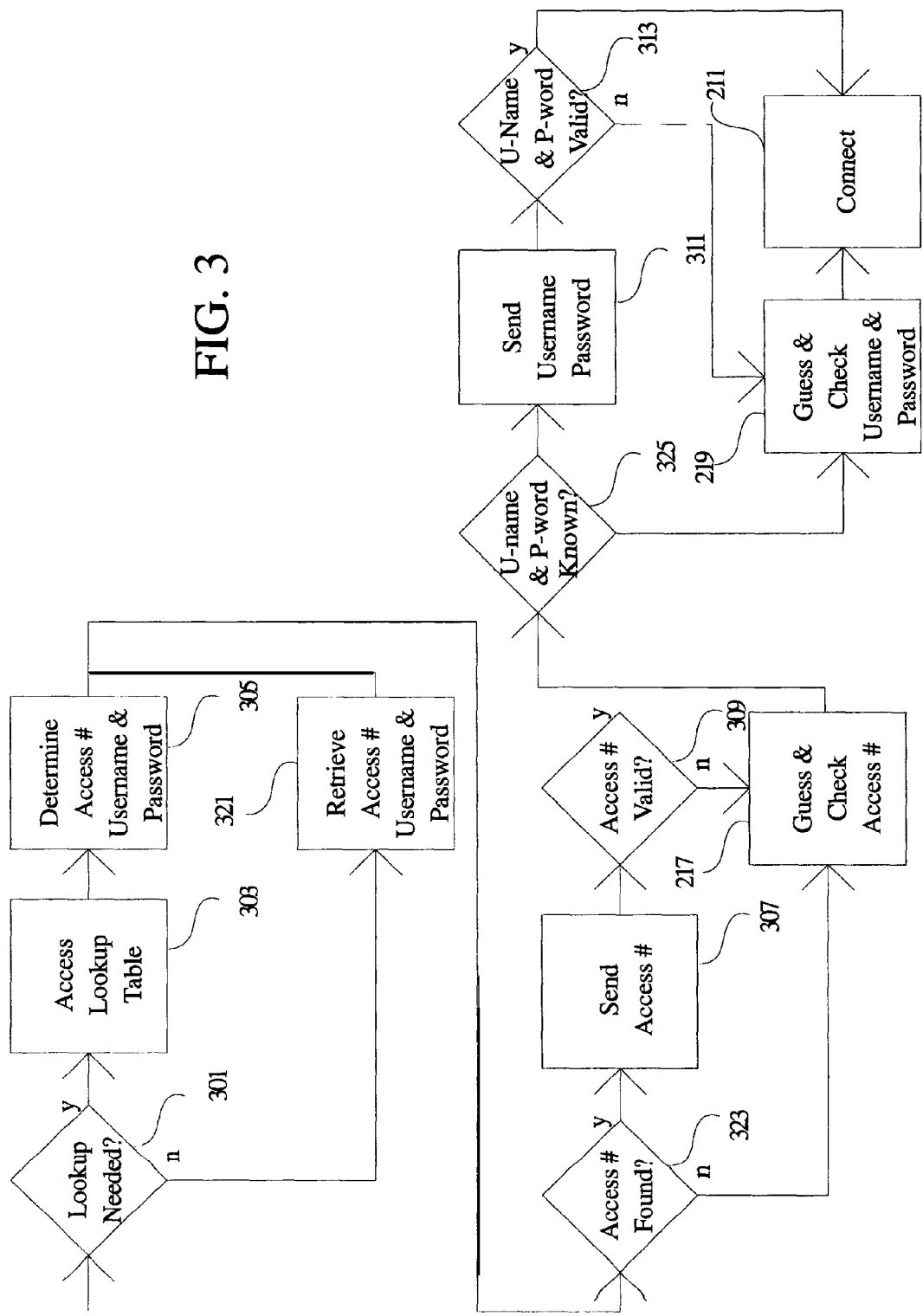
FIG. 3 shows an illustrative exemplary flow for communication provisioning.

FIG. 3 shows an illustrative exemplary flow for communication provisioning 213. In this illustrative implementation, the vehicle-based communication system first determines if a lookup is needed 301.

Presently, different carriers (or providers) use different access numbers and different user name/password configurations. While this may be standardized at some point, presently, if a user wishes to connect to, for example, an AT&T phone as opposed to a VERIZON phone, a different number, user name and password will be needed.

Although the carriers use different numbers and user name/password combinations, these numbers and combinations are also generally standardized within a carrier. For example, if connecting to an AT&T or CINGULAR device, the username would be either wap@cingulargprs.com (for a wireless access point "WAP" connection) or isp@cingulargprs.com (for an internet service provider "ISP" connection). The password in either case is "cingular1." Further, it is the case that the phone either has no access number (also known as a access point name, or "APN"), or has an APN specific to all AT&T CINGULAR phones. Many major providers are similarly standardized internally.

It may be the case that there is already an APN and/or username and password associated with the wireless device. This could have been from a previous usage of the device, from user input, or for a variety of other reasons. For example, the vehicle-based computing system may have previously looked-up and stored the connection information for a particular device in a profile associated with the device and kept in persistent memory. If such information is available without using a look-up table, the information is retrieved 321 for use.

On the other hand, a look-up may be necessary. In this illustrative embodiment, the vehicle-based communication system is provided with a look-up table containing, for example, common carriers and the APNs and user name/password combinations for those common carriers.

Also, in this illustrative embodiment, the system has established a carrier name (through, for example, a carrier string) and can use the carrier name to cross reference the look-up table to find the appropriate information 303. Once the carrier name is found on the look-up table, the APN and/or user name/password combination may be determined 305.

After either attempting to retrieve the APN and user name/password combination or attempting to look the information up, the system checks to see if an APN was found 323. It may be the case that the carrier information was not available in the look-up table, or that the stored information was corrupted or otherwise unavailable.

If an APN was found, the system sends the APN to the wireless device 307 in an attempt to initiate a connection. If the APN is valid 309, the system can proceed to entering a user name/password. If the APN is invalid 309 for some reason, or if the APN was never found, the system can still attempt to use a guess-and-check method 217 to determine an appropriate APN (described in detail with respect to FIG. 4).

Once a valid APN has been sent to the wireless device, the system checks to see if a user name and password are known 325. It may be the case that only the APN is available from the look-up table, or, again, stored information may be corrupted or unavailable.

If the user name and password have been determined or retrieved (or otherwise obtained), the system sends the user name and password to the device to login to the device 311.

If the device rejects the user name and/or password, or if the user name or password are not known, the system may attempt to use a guess-and-check method to determine the user name and/or password 219.

If the user name and password are accepted by the device, the system stores the APN, user name and password for later use 327. This may help provide faster access in the future, as the steps of obtaining this information may be expedited by the stored information.

The system may then attempt to connect to the internet (or other network) through the connection with the wireless device 211.

Figure 4:
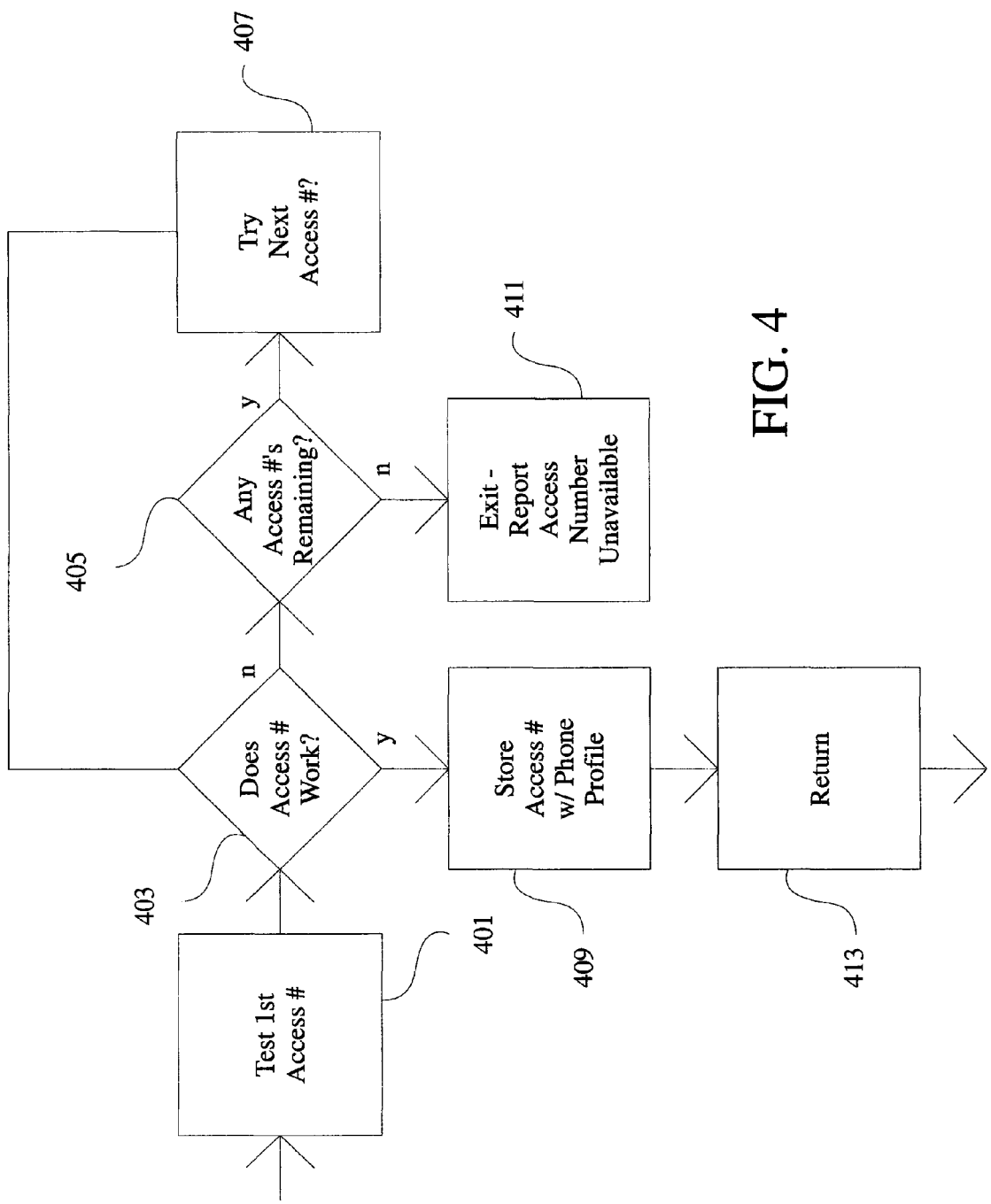
FIG. 4 shows an illustrative exemplary flow for guessing an access number.

FIG. 4 shows an illustrative exemplary flow for guessing an access number. The exemplary processes previously described herein illustrate several situations, 309 and 215 wherein it might be desirable to have a system guess-and-check for an APN. These are, of course, illustrative and not meant to limit the scope of the invention in any manner.

If the system is unable to automatically determine an APN for some reason, it may resort to a guess-and-check method for attempting to determine the APN. For example, it may be the case that all carriers use one of N numbers for an APN. Or, although a carrier name may be unavailable or unknown, the carrier may still provide service for a particular wireless device. In this instance, the APN usable were the carrier name known should be the same APN to provide service to the unknown-carrier wireless device. Accordingly, in situations such as this, a guess-and-check methodology may successfully provide an APN and allow a connection to be established.

In this illustrative embodiment, the system has a list of common and/or possible APNs provided thereto. In some order, the system will test these APNs and determine which, if any, are usable with a given wireless device.

Starting at some point on the list, the system tests a first APN against the wireless device 401. If access is established, 403, the system can store the APN with a wireless device profile (assuming such storage is available) 409. The system can then return to a process that called the guess-and-check process 413.

If the APN does not work 403, the system checks to see if any APNs are remaining 405. If no APNs remain, the system exits and reports that an APN is unavailable 411. Alternatively, for example, the system could query a user to see if the APN is known, connect to the internet (through, for example, a voice over IP connection) and see if APNs are available that have not been tested, instruct the user to enter an appropriate APN at a later time online and send it to the system for an update, etc.

If any APNs remain on the list, the system tries the next APN (or a different APN) 407, and repeats the attempts until finding an APN that works or running out of APNs.

Figure 5:
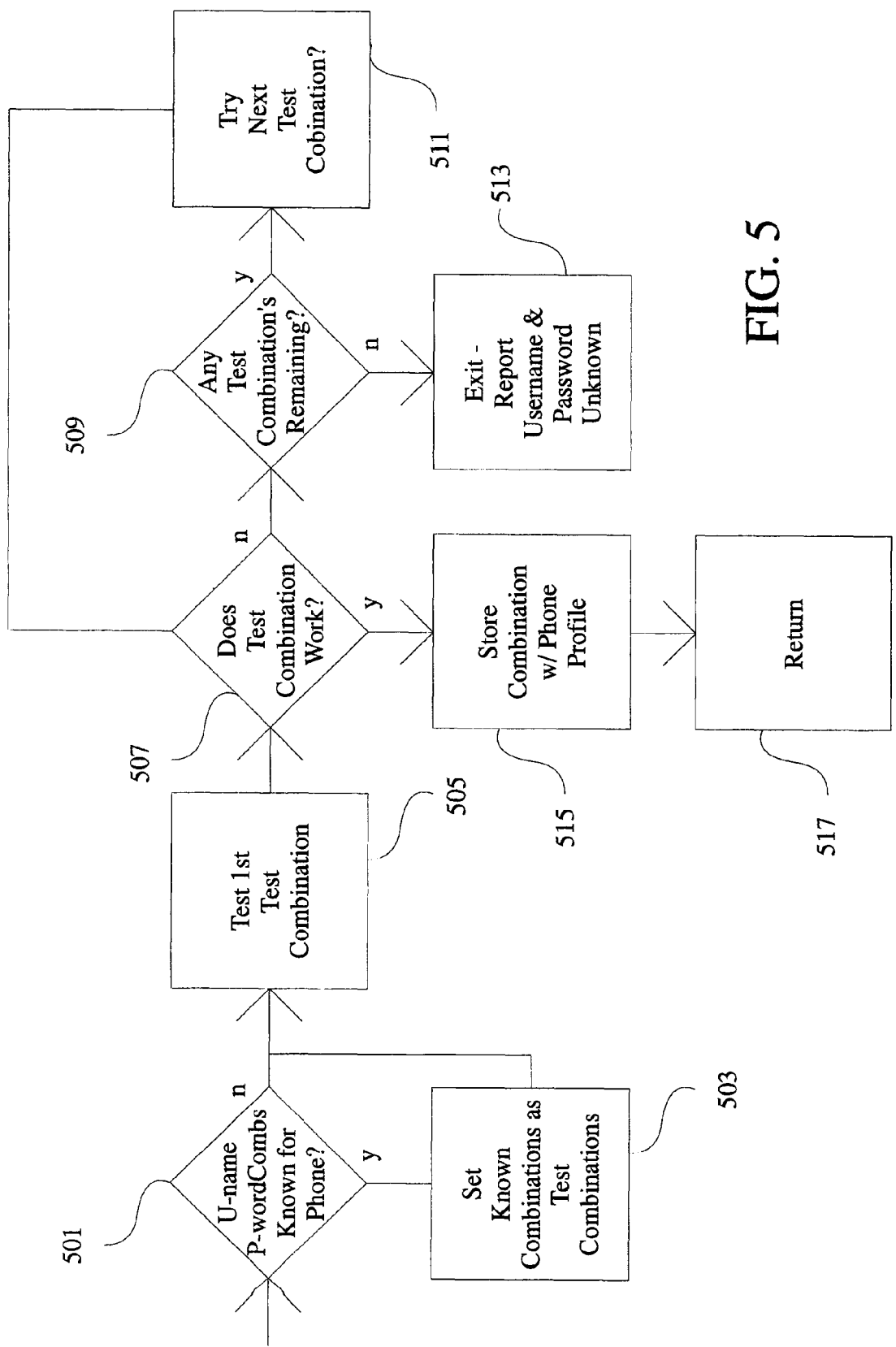
FIG. 5 shows an illustrative exemplary flow for guessing a user name and password combination.

FIG. 5 shows an illustrative exemplary flow for guessing a user name and password combination 219. Again, illustrative non-limiting examples have been previously presented 217, 325 that might give rise to occasion to call an exemplary process such as this.

Similar to the APN, it may be the case that there are a finite number or type of user name/password combinations used across all carriers. Also, as with the APNs, it may be the case that a carrier whose user name/password combination is known provides service for a device, but that the carrier is undeterminable for that device. Accordingly, a guess-and-check methodology may be able to provide a user name and password workable with a particular device.

In this illustrative implementation, the system checks to see if user name password combinations are known for a device 501. As previously noted, certain carriers, such as AT&T/CINGULAR have several user names and passwords that might be usable, depending on how a phone is configured. If connecting to an AT&T or CINGULAR device, the username would be either wap@cingulargprs.com (for a wireless access point "WAP" connection) or isp@cingulargprs.com (for an internet service protocol "ISP" connection). The password in either case is "cingular1."

Thus, the system may have previously known that AT&T is the carrier and tried wap@cingulargprs.com and gotten a rejection, ending at the guess-and-check routine. Since, in this particular case, the system knows the carrier and it also knows that there are only two user names for that carrier, it can set those known combinations as the test combinations 503. This shortens the test list to expedite the process (although other test combinations can be tried if the shortened list is unsuccessful). This is just one example of how some known information can be used to refine the guess-and-check routines.

Whether using a shortened list or using a full list, the system proceeds to test a first user name/password combination 505. If the combination works 507, the combination can be stored with a phone profile (again, if available) 515 and the system can return to the process that called it. If the combination does not work 507, the system can check to see if there are any test combinations remaining 509.

If no combinations remain, the process can exit and return a message that the user name and/or password was unavailable. Again, the the system could query a user to see if the APN is known, connect to the internet (through, for example, a voice over IP connection) and see if APNs are available that have not been tested, instruct the user to enter an appropriate APN at a later time online and send it to the system for an update, etc. In this case, it may be that a provider has decided to have users develop their own user names and/or passwords, and so it may be ideal to have the user input this information before the system can proceed.

If there are combinations that remain 509, the system tries the next remaining combination 511 and repeats this process until finding a combination that works or running out of possible combinations.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed:

1. A vehicle communication system, including:
   a computer processor in communication with persistent and non-persistent memory;
   a transceiver capable of communicating with one or more wireless devices and in communication with the processor;
   wherein the processor is configured to query a wireless device in communication with the processor through the transceiver to obtain wireless device information;
   wherein the processor is configured to determine a carrier identity for a service provider for the wireless device based at least in part on the wireless device information;
   wherein the processor is further configured to determine information for provisioning a connection to a remote network through the wireless device, based at least in part on the carrier identity;
   wherein the processor is configured to connect to the remote network over the connection through the wireless device after provisioning the connection to the wireless device using the provisioning information;
   wherein the processor is configured to determine the provisioning information by testing a plurality of provisioning information sets, associated with the carrier identity, against the wireless device;
   wherein the processor is further configured to determine a carrier identity based on a hands free profile (HFP) received as at least a portion of the wireless device information in response to the query;
   wherein the processor is further configured to receive a carrier string as part of the HFP, which may identify a service provider for the wireless device;
   wherein, if the carrier string does not identify the service provider for the wireless device, the processor is configured to query a user for the carrier identity;
   wherein the processor is configured to retrieve an APN from a profile, residing in at least one of persistent or non-persistent memory, and associated with the wireless device; and
   wherein the processor is configured to retrieve a user name and/or password from a profile, residing in at least one of persistent or non-persistent memory, and associated with the wireless device.

2. The system of claim 1, wherein, if the query does not provide sufficient information for the processor to determine the carrier identity, the processor is configured to query a user for the carrier identity.

3. The system of claim 1, wherein the processor is configured to determine an access phone number (APN) as part of the provisioning information.

4. The system of claim 1, wherein the processor is configured to automatically determine a user name and password as part of the provisioning information.

5. The system of claim 1, wherein the processor is configured to access a lookup table, residing in at least one of the persistent and non-persistent memory, to determine the provisioning information.

6. The system of claim 5, wherein the lookup table contains a plurality of APN and user name/password pairings.

7. The system of claim 1, wherein the processor is configured to store, in persistent and/or non-persistent memory, an APN, the APN being stored in a profile associated with the wireless device.

8. The system of claim 1, wherein the processor is configured to store, in persistent and/or non-persistent memory, a user name and password, the user name and password being stored in a profile associated with the wireless device.

9. The system of claim 1, wherein the connection to the remote network through the wireless device is a wide-band connection.

10. A vehicle communication system, including:
   a computer processor in communication with persistent and non-persistent memory;
   a transceiver capable of communicating with one or more wireless devices and in communication with the processor;
   wherein the processor is configured to query a wireless device in communication with the processor through the transceiver to obtain wireless device information;
   wherein the processor is configured to test a plurality of provisioning information sets stored in persistent and/or non-persistent memory to determine provisioning information for provisioning a connection to a remote network through the wireless device; and
   wherein the processor is configured to connect to the remote network over the connection through the wireless device after provisioning the connection to the wireless device using the provisioning information.

11. The system of claim 10, wherein the processor is further configured to receive a carrier identity, and wherein the plurality of provisioning information sets are provisioning information sets associated with a carrier identity.

12. A vehicle system, including:
   a processor in communication with memory;
   a transceiver for wireless device communication in communication with the processor;
   wherein the processor is configured to query a wireless device through a connection established over the transceiver to determine a carrier identity and to determine connection provisioning information by testing a plurality of carrier identity associated provisioning information sets against the wireless device, the processor being further configured to connect to a remote network over a connection provisioned using the provisioning information;
   wherein the processor is further configured to determine a carrier identity based on a hands free profile (HFP) received as at least a portion of the wireless device information in response to the query;
   wherein the processor is further configured to receive a carrier string as part of the HFP, which may identify a service provider for the wireless device;
   wherein, if the carrier string does not identify the service provider for the wireless device, the processor is configured to query a user for the carrier identity;
   wherein the processor is configured to retrieve an APN from a profile, residing in at least one of persistent or non-persistent memory, and associated with the wireless device; and
   wherein the processor is configured to retrieve a user name and/or password from a profile, residing in at least one of persistent or non-persistent memory, and associated with the wireless device.

* * * * *